United States Patent [19]

Jorgensen et al.

[11] Patent Number: 4,843,189
[45] Date of Patent: Jun. 27, 1989

[54] SCREW ATTACHMENT POCKET WITH GUIDE TAB

[75] Inventors: Robert W. Jorgensen, Niles, Mich.; Kenneth R. Schnell, South Bend, Ind.

[73] Assignee: Hubbell Incorporated, Orange, Conn.

[21] Appl. No.: 246,754

[22] Filed: Sep. 20, 1988

[51] Int. Cl.⁴ .............................................. H02G 3/08
[52] U.S. Cl. ...................................... 174/53; 411/433
[58] Field of Search ........................... 174/53; 220/3.2; 411/433, 437

[56] References Cited

U.S. PATENT DOCUMENTS

| | | | |
|---|---|---|---|
| 3,352,341 | 11/1967 | Schertz | 411/270 |
| 3,876,821 | 4/1975 | Pringle | 174/53 |
| 3,955,463 | 5/1976 | Hoehn | 411/548 |
| 4,071,158 | 1/1978 | Miheu | 220/3.2 |
| 4,315,100 | 2/1982 | Haslbeck | 174/51 |
| 4,424,405 | 1/1984 | Nattel | 174/53 |

*Primary Examiner*—Arthur T. Grimley
*Assistant Examiner*—David A. Tone
*Attorney, Agent, or Firm*—Jerry M. Presson; Walter C. Farley

[57] ABSTRACT

A molded electrical box is provided with attachment housings at opposite ends thereof. The attachment housing include a fixed arcuate surface and a movable partially threaded cam member to engage a screw inserted therein. A guide tab extends partially across the open front of the attachment housing and has an arcuate end surface to guide the screw between the engaging surfaces and prevent the screw from abutting a forwardly facing end of the cam member.

2 Claims, 2 Drawing Sheets

SCREW ATTACHMENT POCKET WITH GUIDE TAB

This invention relates to an electrical box having an improved camming thread engagement structure with a guide tab.

BACKGROUND OF THE INVENTION

In U.S. Pat. No. 4,315,100, Haslbeck, there is shown an electrical box with an electrical device attachment structure having a wedging thread engagement means which is employed in the present invention. As shown in that patent, the electrical box is molded of a thermoplastic or thermosetting plastic and a rectangular protrusion is formed at each end on the outside of the box. A downwardly opening, generally triangular cavity within the protrusion may have partial threads along one wall. A triangular cam member fits within the cavity and has partial threads along the side facing the threaded wall. A screw of suitable size can easily be inserted by pushing the screw between the partially threaded regions and then, as the screw is rotated, the threads on the screw engage the threads on the cam member and the wall, forming a secure mechanical engagement. Any axial force tending to extract the screw pulls the sloping surface of the cam member against the similarly sloping surface of the cavity, increasing the compressive force of the partial threads against the screw and preventing its removal.

While this structure functions quite well, there were some practical problems with the arrangement as shown in the Haslbeck patent including the fact that the box must have molded knockouts to provide entry openings for cables, and that the inner surface of the box must be clear between the knockouts and the open side of the box so that the molded box can be ejected from the mold during production. Partly for molding reasons, the effective, usable interior volume of the box was reduced by about 13% or more, dependent upon box depth, a serious loss of wire fill capacity in a box which must receive a switch, outlet or other electrical device and then accommodate wires as well. The loss of wire capacity detrimentally affects the box rating since the National Electrical Code requires that the box have a certain cubic inch capacity in order to receive wires of specific sizes. Simply rotating the original design 90° would create an unacceptable protrusion on each end of the box. The original box thus had limited utility.

An improved arrangement positioned the screw receiving "pocket" at the front end of a concave, outwardly facing channel at the end of the box, the pocket being rotated so that the arcuate surface on the movable cam member faced generally toward the geometric center of the box. This improvement made the box easier to mold and maximized the interior volume of the box and also allowed access knockouts to be molded into the box at almost any desired location.

It developed, however, that when a screw is inserted into the pocket, and before the screw is rotated to cause thread engagement, the end of the screw sometimes abuts the cam member, giving the feeling that there is an obstruction, even though the problem is only one of misalignment. That abutment often induces the user to push harder, causing the movable cam member to be forced out of the pocket and lost.

SUMMARY OF THE INVENTION

An object of the present invention is to provide an electrical box having improved cam action screw engaging means with a guide tab to promote proper alignment of the screw.

Briefly described, the invention comprises a molded electrical box having first and second generally parallel side walls, first and second generally parallel end walls perpendicular to the side walls, and a back wall forming a box with an open front for receiving wires and an electrical fixture or device. A plurality of cable entry knockouts are formed in each of the end walls adjacent the back wall. First and second screw attachment housings are formed at the front edges of the end walls, each attachment housing including a cavity having an opening facing in the same direction as the box for receiving a screw, means in the cavity defining an arcuate surface facing outwardly from the box, and a first sloping surface in the cavity facing toward the arcuate surface and also toward the back wall. A generally triangular cam member having a second sloping surface and a set of partial threads is insertable into the cavity with the first and second sloping surfaces facing each other and the partial threads of the cam member facing the arcuate surface in the cavity so that the sloping surfaces lie along a longitudinal plane which bisects the box. A convex channel is formed in the outer surface of each of the end walls and extends from each attachment housing to the rear of the box, the housing and the channel being between the knockouts in each end wall.

BRIEF DESCRIPTION OF THE DRAWINGS

In order to impart full understanding of the manner in which these and other objects are attained in accordance with the invention, a particularly advantageous embodiment thereof will be described with reference to the accompanying drawings, which form a part of this specification, and wherein.

DESCRIPTION OF THE PREFERRED EMBODIMENT

Figure 1:
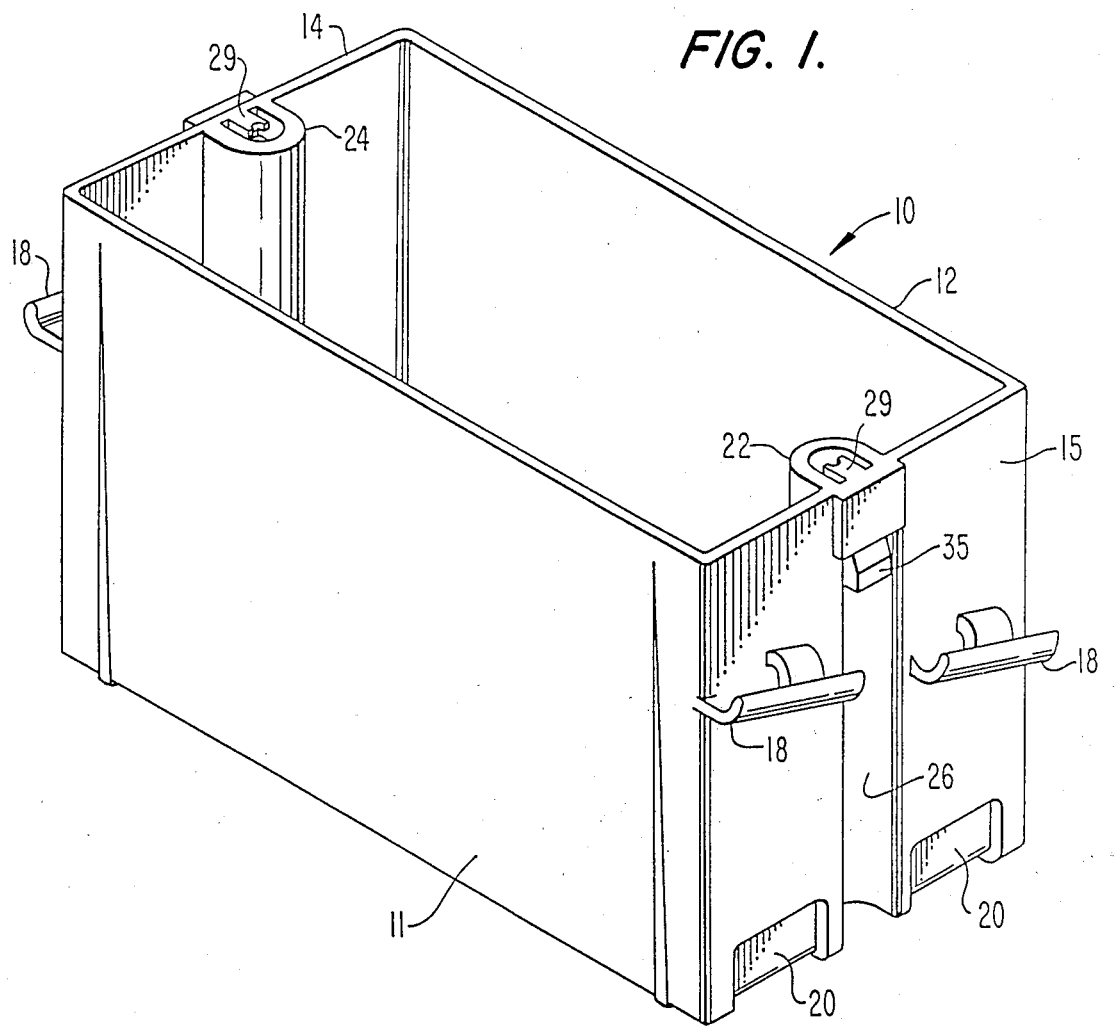
FIG. 1 is a perspective view of a box constructed in accordance with the present invention.
Figure 2:
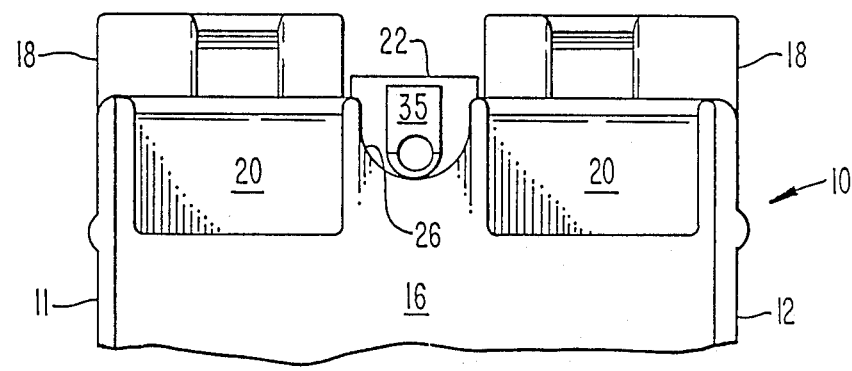
FIG. 2 is a partial bottom plan view of one end of the box of FIG. 1.

Referring first to FIGS. 1 and 2, an electrical box indicated generally at 10 constructed in accordance with the invention includes parallel side walls 11 and 12, parallel end walls 14 and 15, and a back wall 16, the walls being mutually perpendicular to form a box having an open front. The box is preferably molded as a unitary component using a polymeric material which can be a thermoplastic such as PVC, Noryl or the like, or a thermosetting material such as a phenolic. Sloping nail guides 18 are provided in pairs at opposite ends of the box to permit attaching the box to a wooden stud or joist, these nail guides being integrally formed on the outer surfaces of the end walls. Knockouts 20 are formed in the end walls near the rear wall to provide easily removable panels through which cables can be inserted. In the specific embodiment shown, the knockouts are L-shaped and extend around the corners joining the end and rear walls, but various forms of knockouts can be used without affecting the construction or utility of the other aspects of the box insofar as the invention is concerned.

At the upper or front edges of the end wall 15 an attachment housing 22 is formed, the attachment housing itself being somewhat D-shaped as viewed from the front. An identical attachment housing 24 is formed at the front of end wall 14. The inner surface of each attachment housing is somewhat cylindrical in shape and extends all the way down to the inside of the box to the inner surface of rear wall 16. On the outside of the box the attachment housing extends downwardly for a distance of approximately ⅜". Below the housing 22, the outer surface of end wall 15 is formed with a concave channel 26 which extends for the full depth of the box and ends at a U-shaped recess in back wall 16. Thus, as seen in FIG. 2, there is clear, unobstructed access from the back of the box to the lower or back side of housing 22.

Figure 3:
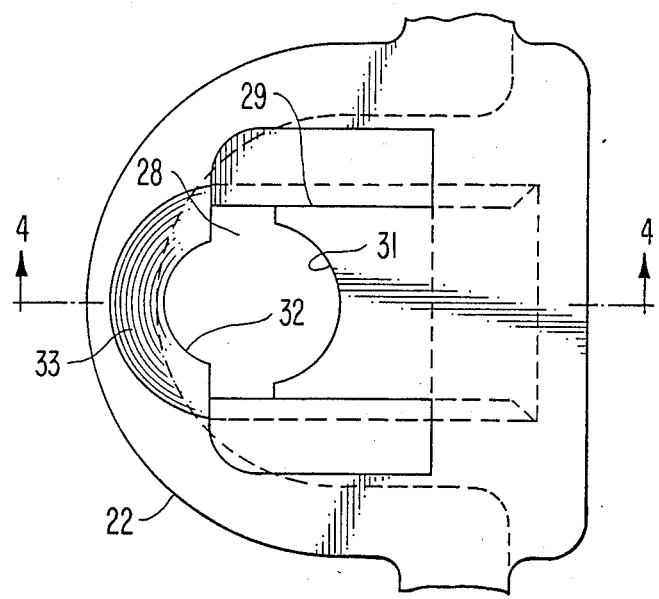
FIG. 3 is an enlarged partial top plan view of an end of the box of FIG. 1 showing a screw attachment housing with a guide tab in accordance with the present invention.
Figure 4:
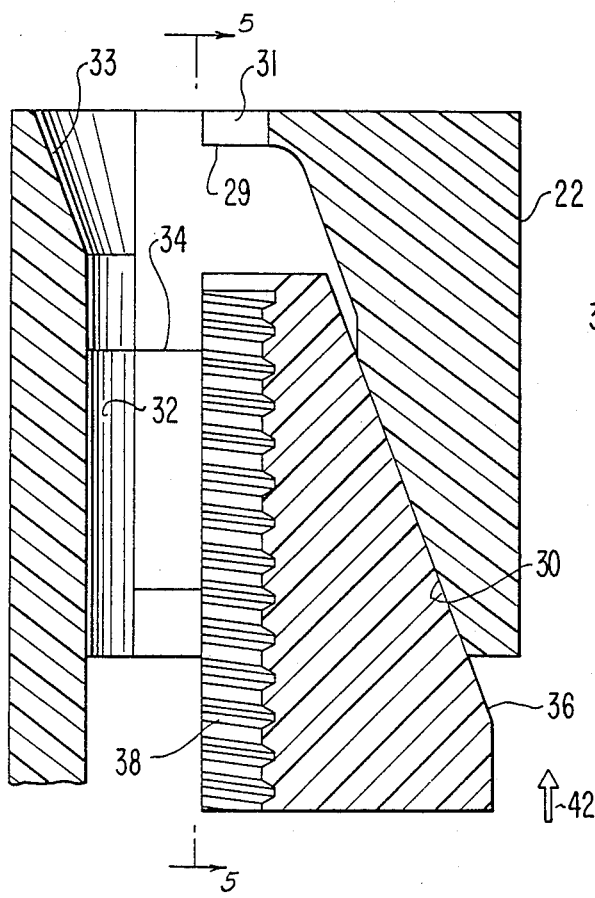
FIG. 4 is a transverse sectional view along longitudinal line 4—4 of FIG. 3.
Figure 5:
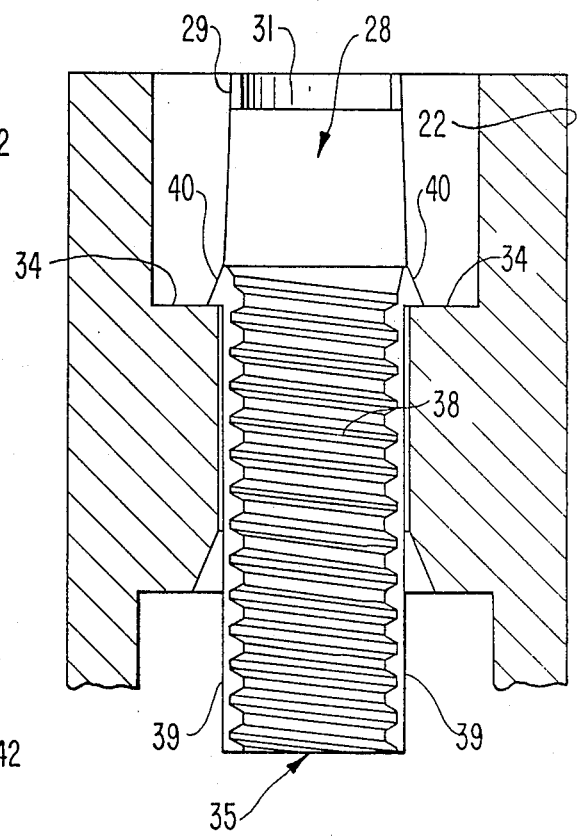
FIG. 5 is a partial sectional elevation along line 5—5 of FIG. 4.

The attachment housing itself is more clearly shown in the enlarged partial and sectional views in FIGS. 3, 4 and 5. Within housing 22 is a cavity indicated generally at 28, the top part of which is generally rectangular and includes an inwardly extending guide tab 29. The lower part of cavity 28 includes an upwardly and inwardly sloping surface 30 which makes an angle of about 70° with the horizontal and which faces inwardly toward the opposite side of the cavity and downwardly toward the rear wall of the housing. Opposite surface 30 within the cavity is an arcuate surface 32 which is formed smooth but which will be impressed with a set of partial threads by an attachment screw such as, for example, a #6-32 machine screw, as will be described.

The upper end of surface 32 merges into a conical, outwardly flaring surface 33 which acts as a guide surface for the end of a screw being inserted. As will be seen in FIG. 5, the upper rectangular portion of cavity 28 is slightly wider than the lower portion, forming shoulders 34 within the cavity, this upper rectangular portion being partly obstructed by tab 29. Surface 32 can be smoothly arcuate, as shown, or can have the shape of a portion of a polygonal cylinder.

A truncated triangular cam member 35 fits within the lower portion of cavity 28. Cam member 35 includes a sloping surface 36 as the hypotenuse of the triangle and has an arcuate face 38 which is formed with a set of partial threads. These threads are partial threads in the sense that they occupy a portion of an arc equal to or less than 180°. The sides 39 of member 35 (FIG. 5) are generally smooth but at the upper ends thereof ears 40 protrude outwardly, the ears having downwardly and outwardly sloping upper surfaces and horizontal lower surfaces.

The width of cam member 35 between surfaces 39 is approximately equal to the width of the lower portion of cavity 28, i.e., the dimension visible in FIG. 5. Thus, a cam member 35 can be inserted upwardly in the direction of arrow 42 in FIG. 4, until ears 40 pass through the lower portion of cavity 28 and snap outwardly above shoulders 34 so that the lower surfaces of the ears can rest on those shoulders. For this purpose, ears 40 must be somewhat resilient and not too large to be compressed between the cavity walls. The ears and shoulders normally inhibit downward movement of the cam member and upward movement is limited by the widest dimension of the lower portion of the cam member in the absence of a screw. However, if excessive force is applied against the upper end of member 35, the ears 40 can be deformed in the reverse direction, allowing the cam member to pass back into the lower part of the cavity and fall away from the box. Such force can be applied by pushing a screw against the cam member rather than into the opening. As will be recognized, the cam member is inserted with its partial threads 38 facing arcuate surface 32 and so that surface 36 is facing sloping surface 30.

Tab 29 extends across the front opening of cavity 28 and terminates in an arcuate end surface 31 which faces the conical surface 33 at the upper end of surface 32. Surface 31 has a radius which is somewhat greater than that of surface 32 and which is slightly larger than the radius of the screw to be received. As best seen in FIG. 4, surface 31 extends across the front opening of cavity 28 to roughly the same extent as the threads on member 35 when ears 40 are resting on shoulders 34 and beyond the upper end of member 35, thereby blocking direct passage of a screw against the upper, truncated end of the cam member and guiding the screw into the space between members 35 and surface 32.

The operation of the apparatus can be very briefly described. With cam member 35 in cavity 28, a conventional No. 6 or No. 8 screw can be inserted from above between arcuate surface 32 and partial thread set 38 by direct axial movement, being guided by surface 31 of tab 29. Following axial insertion, the screw can be rotated in the tightening direction, the threads of the screw engaging partial threads 38 and causing upward movement of cam member 35 until surface 36 contacts surface 30. At this time, the screw is clamped between surface 32 and threaded surface 38 and begins to impress a set of partial threads in surface 32. Any further rotation of the screw causes cam member 35 to move upwardly and inwardly toward the screw, further forming threads 32, compressing the screw and tightening the engagement between the screw threads and the threads on member 35 as well as newly formed threads in surface 32. Firm engagement of the screw is thereby achieved. The screw can readily be removed by simply rotating it in the opposite direction. The newly formed threads, however, remain.

While one advantageous embodiment has been chosen to illustrate the invention, it will be understood by those skilled in the art that various changes and modifications can be made therein without departing from the scope of the invention as defined in the appended claims.

What is claimed is:

1. A molded electrical box of the type including generally parallel side walls, generally parallel end walls perpendicular to said side walls and a back wall forming a box with an open front for receiving wires and an electrical device, first and second screw attachment housings, one in each of said end walls at said open front, each said attachment housing including a cavity having an opening facing in the same direction as said open front into which a screw can be inserted, means in said cavity defining an arcuate surface, a first sloping surface in said cavity and a generally triangular cam member having a second sloping surface and means on another surface defining a set of partial threads, the cam member being insertable into said cavity with said first and second sloping surfaces facing each other and with the arcuate surface facing the set of partial threads so that a screw can be received between the arcuate surfaces, and a guide comprising a guide tab extending partially across said opening of said cavity to block direct access to said cam member, said guide tab having an arcuate distal end surface dimensioned to receive a screw being inserted and to guide said screw between said arcuate surfaces.

2. A structure according to claim 1, wherein the radius of curvature of said distal end surface of said tab is no smaller than the radius of said screw.

* * * * *